Patented Dec. 11, 1934

1,983,954

UNITED STATES PATENT OFFICE 1,983,954

MEDICINE AND PROCESS OF PREPARING SAME

Guy C. Taylor, Decatur, Ill., assignor to Flint Eaton and Company, Decatur, Ill., a corporation of Illinois No Drawing. Application May 20, 1933, Serial No. 672,082

3 Claims. (Cl. 167—57)

This invention relates to a preparation which is highly effective as a means of ingesting calcium into the human body, in the practice of calcium therapy.

Investigators have pointed out that calcium therapy has been seriously hindered by the untoward physiological and pharmacological properties of almost all calcium salts. That is, many are hygroscopic, practically all are nauseatingly salty-bitter to the taste and many are not well borne by the gastro-intestinal tract.

One of the difficulties encountered in calcium therapy is the danger of acidosis and nephritis resulting from the cumulative effect of large doses of calcium chloride as well as lesser objections of tissue irritability and nausea. Calcium lactate is usually not well tolerated.

A change for the better as regards calcium therapy marked the introduction a few years ago of a heretofore untried salt of calcium, namely calcium gluconate. This preparation, a calcium salt of gluconic acid, is an oxidation product of glucose and has the following properties: It is tasteless, soluble in water to the extent of 3% at room temperature and up to 20 or 30% at higher temperatures. It contains approximately 9% calcium and 87% of gluconic acid with some water of crystallization. Physiologically and pharmacologically, it is equivalent of $CaCl_2$ in equimolecular concentrations, and can be administered either orally or by subcutaneous, intramuscular or intravenous injection, being usually well borne by all four routes.

The present invention is an unreactive mixture in dry state, readily soluble in water, has a pleasant taste and is characterized by having the calcium gluconate constituting substantially 50% of the mixture. In this manner, I am able to avoid the use of enormous quantities of effervescent chemicals and at the same time assure that optimum amounts of the calcium will be available.

The product of the present invention, i. e., an unreactive mixture in dry state will comprise an edible acid, such as citric acid, a member capable of reacting therewith to form $CO_2$, in the presence of water such as sodium bicarbonate, and calcium gluconate. It is prepared as a dry mixture and it will be observed that the acid and the carbonate react to produce $CO_2$, in the presence of water, in which surcharged liquid, the gluconate is readily soluble. Various edible acids may be employed as well as ingredients capable of reacting therewith to produce $CO_2$. Of course, the organic acid should be stronger than carbonic acid, so that the reaction will take place and the gas will be liberated.

The advantage of the present invention is, (1), that it affords a pleasant and acceptable means of orally administering calcium to the human body, (2), the mixture comprises a minimum percentage of effervescent chemicals, and (3), it is possible by the use of the mixture to assure within quite accurate limits that the minimum required dose of calcium gluconate will be made available to the user.

In further explanation of the dosage, seventy-five grains three times a day for adults and thirty grains three times a day for children has been considered the proper quantity, and the present preparation enables the user to prepare this dosage without fear of using either too much or too little.

In carrying out the invention, I take by dry weight an edible organic acid, for example I prefer citric acid but maleic, tartaric and the like acids may be satisfactorily employed. The quantity of the edible organic acid is usually thirty parts.

I take also dry sodium bicarbonate or a similar compound which hydrolyzes in water or which is susceptible to reaction with the acid to produce carbon dioxide. The amount of dry sodium bicarbonate employed is usually twenty-five parts.

With respect to the two members just described, it is desirable that the organic edible acid be stronger than carbonic acid, so that when these two effervescent members are in contact in water, the reaction will proceed with the liberation of carbon dioxide.

I preferably employ the dry calcium gluconate in the form of an impalpable powder and to the amount of substantially forty-five parts of the unfused chemicals. The calcium gluconate is present in substantial amount to be therapeutically effective for calcium therapy, i. e., up to 50% of the dry mass. Preferably the calcium gluconate is present in amount greater than the amount of either the edible acid or the amount of the sodium bicarbonate.

It is to be understood that in giving the parts above mentioned, they may be varied more or less, the example given being a preferable one, and consisting of a small mass of the effervescent chemicals and a large mass of the calcium gluconate. In other words, the effervescent chemicals in combined parts by weight are substantially equal to that of the mass of calcium gluconate.

The process proceeds by adding to the dry calcium gluconate substantially five ounces of distilled water to each ninety ounces of dry calcium gluconate when the humidity of the mixing room is indicated by a difference of eight degrees centigrade appearing on the dry and wet bulb thermometer. The nature of calcium gluconate is such that it absorbs this moisture completely and the addition of such moisture does not set up a reaction between the alkali material and the organic acid when these materials are mixed and triturated. The necessary amount of distilled water, as stated, is added to the dry calcium gluconate and thoroughly distributed. I also add to each ninety ounces of dry calcium gluconate three ounces of alcohol in which is dissolved an aromatic substance (about 3 drams), for example, oil of lemon which is thoroughly distributed by the alcohol.

Thereafter, the dry sodium bicarbonate is added and the two materials are thoroughly mixed, for example, by screening. Then the organic acid is added to the mixture and completely incorporated while all three ingredients are in a dry state.

The addition of the moisture and the aromatic solution to the calcium gluconate must be undertaken with care so as not to set up any reactions between the edible acid and the bicarbonate when the mixture is produced. The treatment may proceed in other ways, it being, however, the purpose of this step to prepare the mass so that it may subsequently be fused.

The substantially dry mixture as prepared is now fused in a suitable vessel by application of heat. The alcohol greatly aids the fusion of the chemicals. I have used, for example, a water bath with good results. Observations are carefully taken and when the mixture has assumed the proper consistency the heating is discontinued and the mass in fused condition is broken into granules by being forced through a #6 screen or one of any suitable mesh. The granular material screened in this manner is now dried thoroughly. It is preferable to use low temperature driers as by circulating air without application of heat.

There is comparatively little loss of carbon dioxide when the material is prepared by this method. Examination of the material discloses that the mixture is unreactive, and it will analyze approximately fifty per cent calcium gluconate, the gain being due to a loss of water of crystallization in the organic acid. The resultant mixture, therefore, contains the effervescent chemicals in substantially fifty per cent and the calcium gluconate in equal percentage. In this manner, it is unnecessary to utilize large quantities of effervescent chemicals in order to obtain the required amount of calcium gluconate for the dosage. In fact, the calcium of gluconate is fifty per cent of the mass as above stated.

The preparation is now packed in air-tight sealed containers and is ready for distribution.

In view of the fact that the percentage of calcium gluconate in the product is determined, a user by adding the directed quantity to water will be assured of having in solution the required dosage of calcium gluconate. This is important because with compounds now available it is difficult for physicians to undertake calcium therapy without fear that the user will use either too little or too much of the products and hence lose the desirable effect or injure the system.

While I have indicated the optimum required quantity of calcium gluconate for a dosage, it is to be understood that by the present invention the percentage of calcium gluconate present in the mixture can be varied within wide limits up to and including this maximum dosage.

The user will take a teaspoon of the material or a partially filled teaspoon, as the case may be, and add it to either cold or warm water. The acid and bicarbonate will react and the gluconate is quite soluble in the freshly surcharged carbonic water. It is preferable to use warm water, the solution being more rapid, but equally good results are obtained with cold water.

It will be observed, therefore, that the preparation is an unreactive mixture in dry state comprising ingredients which however will react in the presence of water to produce ready solution of the calcium gluconate therein and that the ingestion of calcium will take place effectively and pleasantly and in the proper amount, without recourse to tremendous amounts of effervescent chemicals.

I claim:

1. A dry, fused mixture in granular form for oral administration and unreactive in the absence of water comprising calcium gluconate, an edible organic acid and a member of the order of sodium bicarbonate capable of reacting in the presence of water with said organic acid to liberate carbon-dioxide and surcharge the water, the calcium gluconate being present in the dry mass in percentage greater than the other members.

2. A dry, fused mixture in granular form for oral administration and unreactive in the absence of water comprising calcium gluconate, an edible organic acid and a member of the order of sodium bicarbonate capable of reacting in the presence of water with said organic acid to liberate carbon-dioxide and surcharge the water, the calcium gluconate constituting substantially fifty per cent of the dry mass.

3. The process of preparing a dry mixture in granular form for oral administration and unreactive in the absence of water of calcium gluconate, an edible acid and a member capable of reacting therewith in the presence of water to liberate $CO_2$, which comprises adding to dry calcium gluconate and distributing therein, water in amount to promote fusion of the three ingredients but insufficient to produce reaction of the two $CO_2$ producing members when the water is distributed in and absorbed by the calcium gluconate and when the two $CO_2$ producing members are mixed with the calcium gluconate, thereafter mixing with the calcium gluconate having the absorbed water, the edible acid and a member of the order of sodium bicarbonate, both in dry state, fusing the mixture, and particulating the fused mixture to granular form.

GUY C. TAYLOR.